United States Patent [19]

Sumigawa

[11] Patent Number: 5,232,387
[45] Date of Patent: Aug. 3, 1993

[54] EXHAUST DEVICE FOR A FOUR-CYCLE OUTBOARD MOTOR

[75] Inventor: Yukio Sumigawa, Hamamatsu, Japan

[73] Assignee: Sanshin Kogyo Kabushiki Kaisha, Hamamatsu, Japan

[21] Appl. No.: 717,086

[22] Filed: Jun. 18, 1991

[30] Foreign Application Priority Data

Jun. 18, 1990 [JP] Japan .................. 2-159384
Jun. 27, 1990 [JP] Japan .................. 2-169067

[51] Int. Cl.⁵ ............................. B63H 21/38
[52] U.S. Cl. ........................ 440/088; 440/89; 440/900
[58] Field of Search ............ 440/88, 89, 76, 900; 123/195 P; 60/310; 181/251, 260

[56] References Cited

U.S. PATENT DOCUMENTS 4,498,875 2/1985 Watanabe ................ 440/88
4,604,069 8/1986 Taguchi ................ 440/89
4,802,871 2/1989 Watanabe et al. ........ 440/88

FOREIGN PATENT DOCUMENTS

47-27113 8/1972 Japan .
58-43895 3/1983 Japan .
0097492 4/1988 Japan .................. 440/88

Primary Examiner—Edwin L. Swinehart
Attorney, Agent, or Firm—Ernest A. Beutler

[57] ABSTRACT

An arrangement is provided for the lubricating, cooling and exhaust systems of a four-cycle outboard watercraft motor. Coolant is drawn from the body of water within which the watercraft is operated for circulation through the engine cooling system. Subsequently, the coolant is brought into proximity with an exhaust pipe extending downwardly from the engine within an encasing member. After passing downwardly along the exhaust pipe the coolant is finally directed towards an exhaust gas expansion chamber and a cooling water jacket provided around the expansion chamber. In order to prevent any of the cooling water from splashing back up against an oil reservoir, also located within the casing, a cover is provided across the tops of the expansion chamber and its accompanying cooling water jacket. Coolant water or air may fill the voids separating the various components contained within the encasing. The arrangement is particularly effective in preventing the corrosion of the oil reservoir housing due to back-splashed coolant when the watercraft is operated in salt water; cooling the components contained within the encasing; and, minimizing heat transfer from higher temperature operating components to lower temperature operating components.

49 Claims, 7 Drawing Sheets

EXHAUST DEVICE FOR A FOUR-CYCLE OUTBOARD MOTOR

BACKGROUND OF THE INVENTION

This invention relates to an outboard motor and more particularly to an exhaust device for use in a four-cycle outboard motor.

Outboard motors are normally powered by two-cycle engines because of the simplicity of these engines. However, there are many instances when it is desirable to employ a four-cycle internal combustion engine as the propulsion unit for an outboard motor. If a four-cycle engine is employed, it is necessary to provide an oil sump for the lubrication system of the engine. The oil sump may be located within the engine casing in the form of an oil pan.

It is further known, with many outboard motors, to cool an engine with liquid obtained from the body of water in which an associated watercraft is operated. The water is circulated through the cylinder block and cylinder head of the engine to cool the engine. In addition, the exhaust gases are discharged downwardly through at least a portion of the drive shaft housing for expulsion either into the body of water or directly into the atmosphere. It is often desirable to provide cooling for the exhaust gases before they are discharged so as to avoid unnecessary overheating of the drive shaft housing and to serve a silencing function during engine operation. One method which has been proposed for cooling the exhaust gases is to surround an exhaust gas flow passage with cooling water. Another alternative is to discharge the coolant into an exhaust expansion chamber.

As has been noted, the coolant for a water-cooled outboard motor may be drawn from the body of water in which the motor operates. Frequently, the motors are operated in salt water. When a four-cycle outboard motor is constructed so that the coolant is introduced between its oil pan and its exhaust passage, or into its exhaust expansion chamber, the coolant may frequently come into contact with, and adhere to, the outer surface of the oil pan. If salt water is used, the salt can be crystallized by the heat of the exhaust gases. As the crystallization proceeds, the crystallized salt absorbs moisture from the air and corrodes the outer surface of the oil pan with oxygen obtained therefrom.

In addition, in a conventional arrangement for a four-cycle outboard motor, hot exhaust gases released into an expansion chamber may contact the outer surface of the oil pan, thereby imparting heat to the lubricant contained therein. Such undesirable heating of the lubricant can cause it to deteriorate, rendering the lubricant much less effective.

It is, therefore, a principal object of this invention to provide an improved exhaust gas cooling arrangement for a four-cycle outboard motor.

It is a further object of this invention to provide an exhaust gas device which can prevent salt from seawater coolant from adhering to and corroding the outer surface of an oil pan.

It is yet another object of this invention to prevent the undesirable breakdown of engine lubricant due to its contact with hot exhaust gases.

It is still a further object of this invention to provide a liquid cooling arrangement for an engine effective to maintain the lubricating and exhaust components of an outboard motor at a relatively low and efficient temperature during engine operation.

SUMMARY OF THE INVENTION

This invention relates to an exhaust arrangement for a four-cycle outboard motor. According to a first feature of the invention an exhaust pipe extends from a region beneath the motor into a primary expansion chamber. An oil reservoir is juxtaposed with respect to the exhaust pipe within a casing member. A water jacket for containing liquid coolant surrounds at least a portion of the exhaust pipe.

According to a second feature of the invention a primary expansion chamber is provided in a housing. An oil reservoir is also provided in the housing above the primary expansion chamber, and a water jacket surrounds at least a portion of the primary expansion chamber. A cover extends across an upper portion of this water jacket for preventing coolant contained therein from splashing out of the water jacket.

According to a third feature of the invention an exhaust pipe extends from a region beneath the motor into a primary expansion chamber. An oil reservoir is juxtaposed with respect to the exhaust pipe within a motor encasing member. A chamber area is provided within the encasing member. The chamber area is bounded by an inner side of the encasing member, an outer side of the oil reservoir, an outer side of the exhaust pipe, and an outer side of the expansion chamber. Further, means are provided for introducing a liquid coolant into the chamber area so that the liquid coolant is contained within, and fills, the chamber area.

DETAILED DESCRIPTION OF THE PREFERRED EMBODIMENTS

Figure 1:
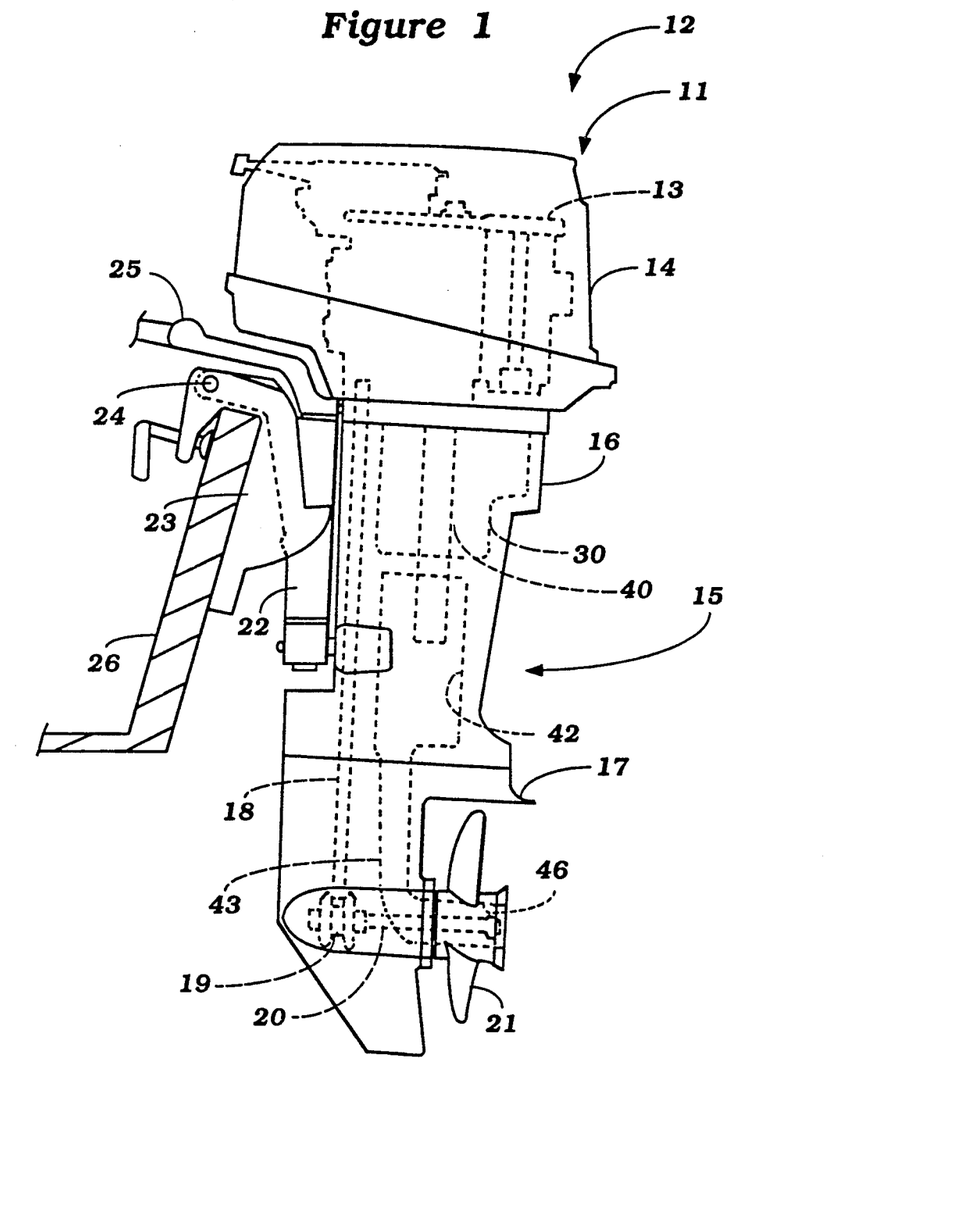
FIG. 1 is a side elevational view of an outboard motor constructed in accordance with a first embodiment of the invention.
Figure 2:
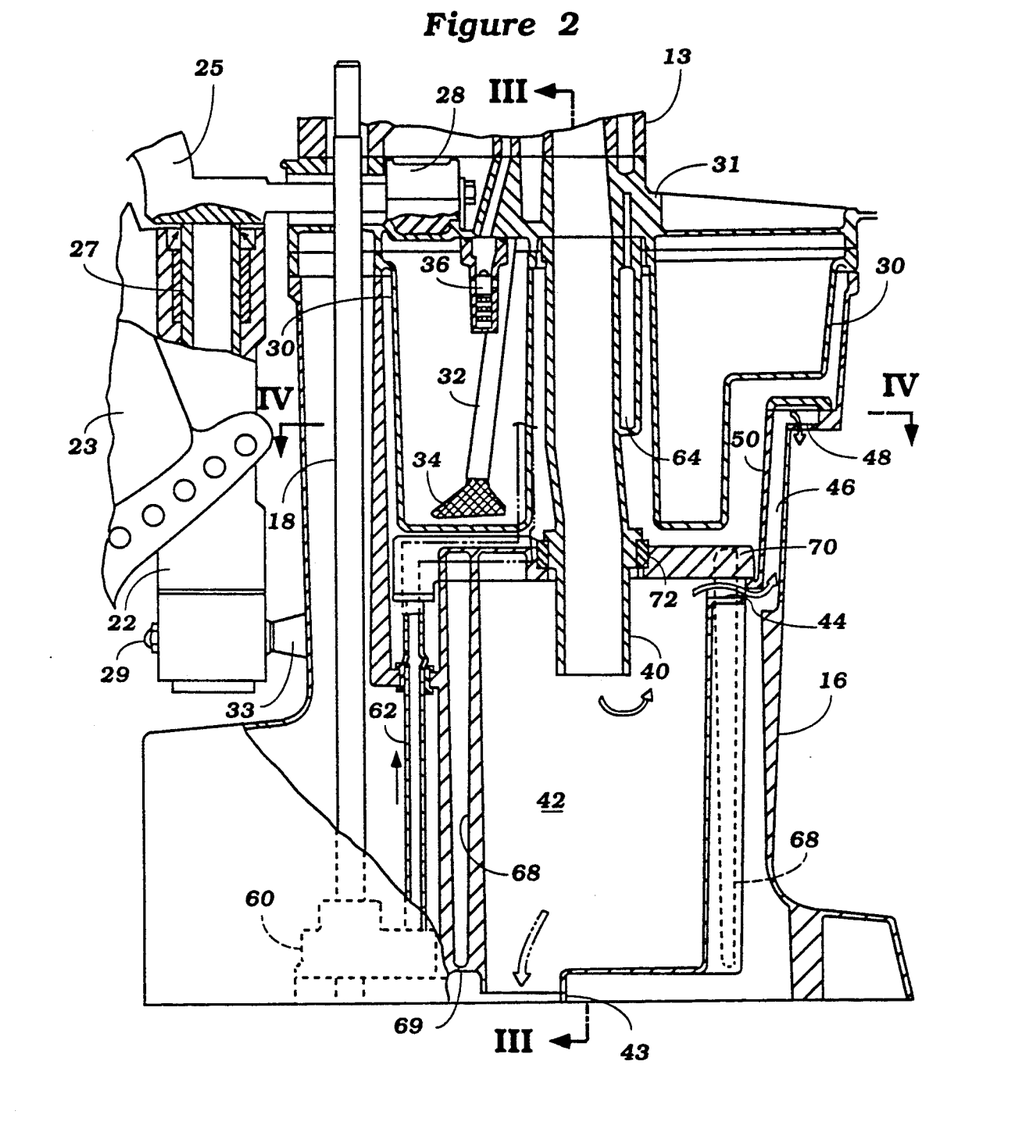
FIG. 2 is an enlarged cross-sectional view taken through a portion of the power head and upper portion of the drive shaft housing showing the engine and its exhaust, lubricating and cooling systems in accordance with the first embodiment.

Referring first to FIGS. 1 and 2, an outboard motor constructed in accordance with a first embodiment of the invention is identified generally by the reference numeral 11. The outboard motor 11 includes a powerhead, indicated generally by the reference numeral 12, containing a four-cycle internal combustion engine 13 and surrounded by a protective cowling 14. The powerhead 12 is connected to the upper side of a support plate 31. A drive shaft housing 15 depends from the lower side of the support plate 31. At the lower end of the drive shaft housing 15, a lower unit 17 depends. A drive shaft 18 depends from the powerhead 12, through the support plate 31 and the drive shaft housing 15, and terminates in the lower unit 17. The drive shaft 18 drives a forward, neutral, reverse transmission 19 that is operative in a known manner so as to drive a propeller shaft 20 and propeller 21 that is journaled in the lower unit 17.

The outboard motor 11 and, specifically the drive shaft housing 15, is supported for steering movement about a vertically extending axis, in a known manner, by means including a swivel bracket 22. The swivel bracket 22 is, in turn, pivotally connected to a clamping bracket 23 for movement about a horizontally extending tilt axis 24. The clamping bracket 23 is adapted to be affixed to a transom 26 of an associated watercraft in a known manner.

Steering operations are carried out by way of a steering bracket 25. As can best be seen with reference to FIG. 2, the steering bracket 25 extends rearwardly, with respect to an associated watercraft, into the support plate 31, and is secured therein by way of a clamp 28. A vibration dampening member may be interposed between the portion of the steering bracket 25 held by the clamp 28 and the clamp member itself, in order to prevent the transmission of vibrations between the motor and the steering bracket 25. A steering shaft 27 depends from a portion of the steering bracket, located forwardly of the clamp 28, and is journaled for pivotal rotation within the swivel bracket 22. The lower end of the steering shaft 27 is secured to the drive shaft housing's upper casing 16 by way of another fastener 29. This connection is also vibration dampened by way of a further dampening member 33 which is interposed between the upper casing 16 and the steering shaft 27. The construction of the motor 11 as thus far described may be considered to be conventional.

Figure 3:
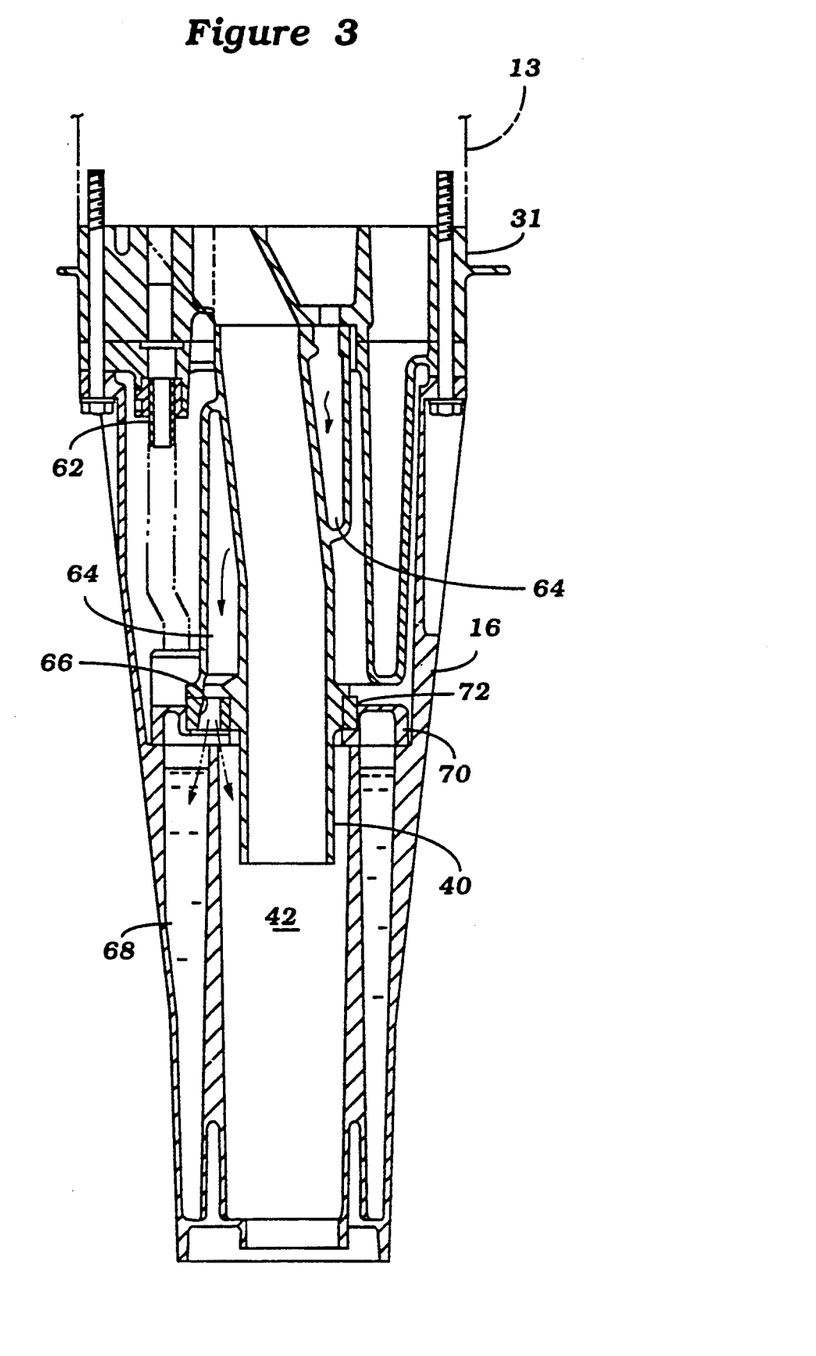
FIG. 3 is a cross-sectional view taken along the line III—III of FIG. 2.
Figure 4:
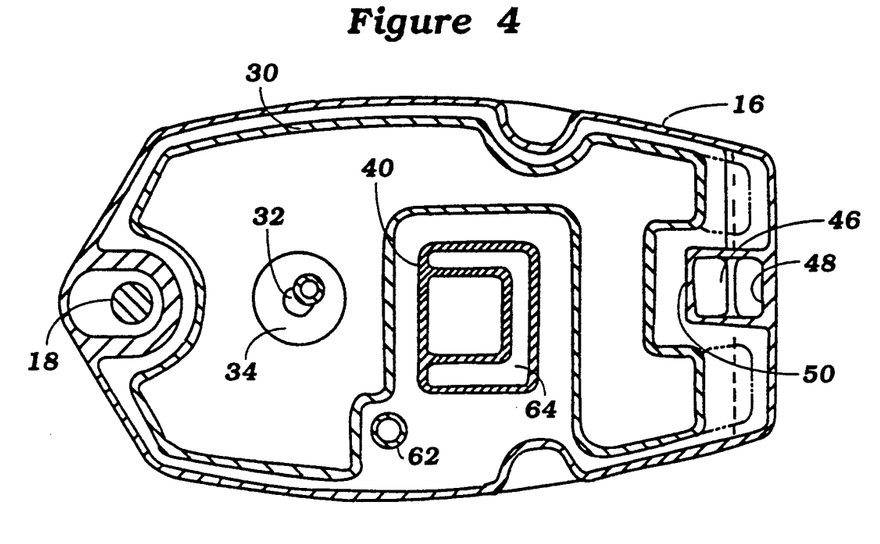
FIG. 4 is a cross-sectional view taken along the line IV—IV of FIG. 2.

Referring now additionally to FIGS. 2 through 4, the engine 13 is provided with a lubricating system that includes an oil pan 30 that is supported between the underside of a support plate 31 and the drive shaft housing's upper casing 16. The oil pan 30 is positioned beneath the support plate 31 within the upper casing 16 of the drive shaft housing 15. Because the oil pan 30 is positioned within the drive shaft housing 15, it is possible to mount the engine 13 lower than if the oil pan were positioned above the support plate 31 and thus a relatively compact, low center of gravity motor 11 is provided.

An oil intake pipe 32, which directs lubricant upwards toward the engine, depends into the oil pan 30 and has at the opening at its lower end a screen 34 for preventing the introduction of large foreign particles into the lubricating system. A relief valve 36 is affixed to the underside of the support plate 31 and depends into the upper portion of the oil pan 30. The relief valve 36 allows for recirculating lubricant from the pressure side of the engine lubricating system back to the oil pan 30 when the lubricant pressure within the engine exceeds a predetermined value. A further passage (not shown) is also provided from the engine 13 leading into the oil pan 30 which allows recaptured oil from the engine 13 to return to the oil pan 30 for subsequent recirculation.

The exhaust system of the invention includes an exhaust pipe 40 which extends downwardly from the engine 13 through the drive shaft housing 15, as shown in phantom in FIG. 1. As can best be seen by reference to FIG. 4, the exhaust pipe extends vertically downward through a centrally located recessed portion of the oil pan 30. The exhaust pipe 40 and the oil pan 30 are spaced apart from one another somewhat, providing a gap of space, which serves to insulate against transmission of heat from the exhaust gases to the oil pan. The lower end of the exhaust pipe 40 is provided with an outlet opening for the discharge of the exhaust gases into a primary expansion chamber 42.

When the watercraft is operating at relatively high speeds, the exhaust gases flow downwardly towards the lower portion of the primary expansion chamber 42 and continue to flow downwardly through a further exhaust pipe 43. The exhaust pipe 43 guides the exhaust gases through the lower casing 17 of the drive shaft housing 15 to an exhaust gas outlet 46 formed within the hub of the propeller 21. Thus, under high speed operating conditions, the exhaust gases are discharged from the propulsion unit at a point located beneath the water level within which the watercraft is operating.

When the watercraft is operating at relatively low speeds, or at idle, the lower unit 17 is normally more deeply submerged beneath the water than under high speed operation. Thus, an increased backpressure makes it more difficult for the exhaust gases to exit via the through the hub exhaust gas outlet 46 under such low speed operation. Accordingly, a low speed exhaust gas outlet arrangement is provided. The exhaust gases, after being discharged through the outlet of the exhaust pipe 40 into the primary expansion chamber 42, turn upwards toward the upper region of the primary expansion chamber under low speed operating conditions. The gases then pass through a throttle passage 44 and are discharged into a secondary expansion chamber 46. This secondary expansion chamber 46 is bounded by an inner side of the upper casing 16 of the drive shaft housing 15 and by a wall 50. An exhaust gas outlet 48 is located at the upper end of the secondary expansion chamber 46, through the upper casing 16, allowing the exhaust gases to discharge into the atmosphere.

The cooling system for the engine 13 includes a water inlet (not shown) positioned within the lower unit 17 that permits water to be drawn from the body of water in which the watercraft is operating. The water inlet supplies a delivery pipe (not shown) from which, in turn, water is drawn by a coolant pump assembly 60 that is driven from the drive shaft 18. The coolant pump 60 is located at a position proximate to the region at which the lower unit 17 attaches to the remainder of the drive shaft housing 15. Such placement of the pump 60 allows for easy access to the coolant pump arrangement 60 for servicing purposes. The coolant then flows upwardly for delivery to the cooling system of the engine 13 through a water delivery pipe 62.

A water passage 64, formed integrally with the exhaust pipe 40, curves downwardly around the exhaust pipe 40 in a direction leading from the support plate 31 towards the expansion chamber 42. Coolant water is delivered from the engine 13, after passing through the engine cooling system, through the support plate 31 and into the water passage 64. The coolant water is then passed in proximity to the exhaust gases which pass through the exhaust pipe 40. An outlet 66 is located at the lower end of the water passage 64. Upon exiting the water passage 64 through the outlet 66 a portion of the coolant water is directed towards the primary expansion chamber 42. This portion of the coolant water enters the expansion chamber 42 and directly contacts the exhaust gases located therein. Another portion of the coolant water is directed towards a water jacket 68 surrounding the primary expansion chamber 42 in order to cool the outer surface thereof. These various cooling steps utilizing the coolant water help to cool the exhaust gases, and thereby quiet the operation of the engine.

A small drain hole 69 is provided at a lowermost region of the water jacket 68 to allow for the escape of an amount of coolant water. The amount of coolant escaping from the water jacket 68 is rather small so that during operation of the engine the jacket 68 remains essentially full of coolant due to the constant replenishment of the coolant from the outlet 66. Of course, when operation of the engine is ceased, the coolant water may completely drain out of the water jacket 68 through the drain hole 69, as no such replenishment then takes place.

In order to prevent any of the coolant water from contacting the outer surface of the oil pan 30, for example, by way of splashing caused by exhaust pressure or other external forces, a cover 70 is provided across the tops of the water jacket 68 and primary expansion chamber 42. The exhaust pipe 40 extends through a first passage provided within the cover 70, and a sealing ring 72 securely seals the region between these two members. A second passage through the cover 70, positioned adjacent to the exhaust pipe passage, comprises the outlet 66 which directs the coolant water downwardly into the expansion chamber 42 and water jacket 68.

In addition to serving as a liquid splash barricade, preventing the splashing of coolant water onto the exterior surface of the oil pan 30, the cover 70 isolates the oil pan 30 from exhaust gases within the primary expansion chamber 42. Thus, heat is not imparted to the oil pan 30 due to direct contact with hot exhaust gases within the expansion chamber 42. The oil pan 30 is further insulated against direct contact with exhaust gases within the secondary expansion chamber 46 by the wall 50.

The further embodiments of the invention will now be described with reference to the remaining Figures. Since many of the components of the first embodiment as described above are similarly present in the further embodiments, like reference numerals are employed in the remaining description to represent like elements as presented in the first embodiment.

Figure 5:
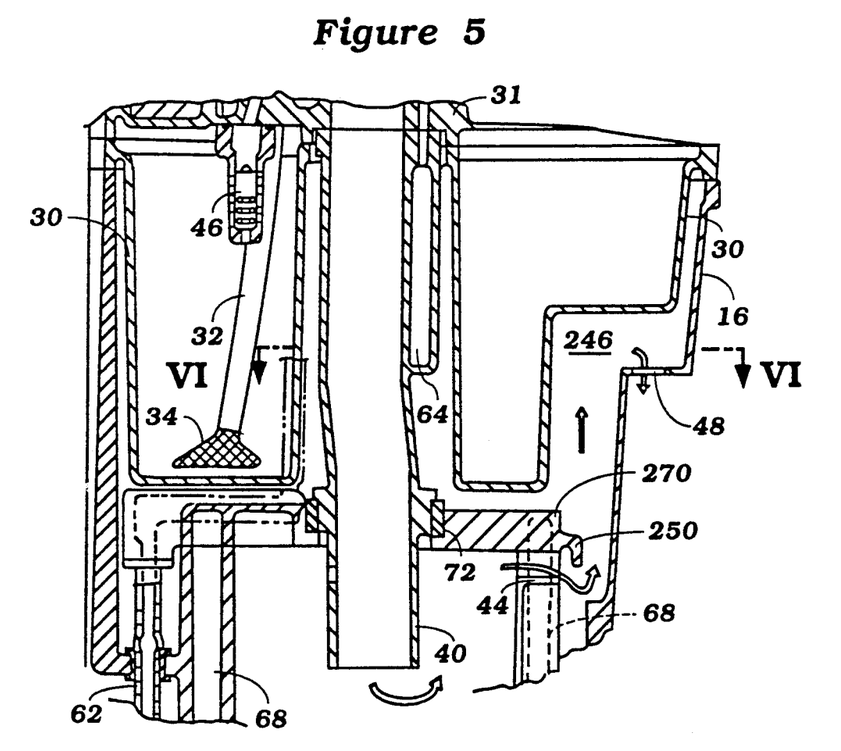
FIG. 5 is an enlarged cross-sectional view taken through a portion of the power head and upper portion of the drive shaft housing showing the engine and its exhaust, lubricating and cooling systems in accordance with a second embodiment of the invention.
Figure 6:
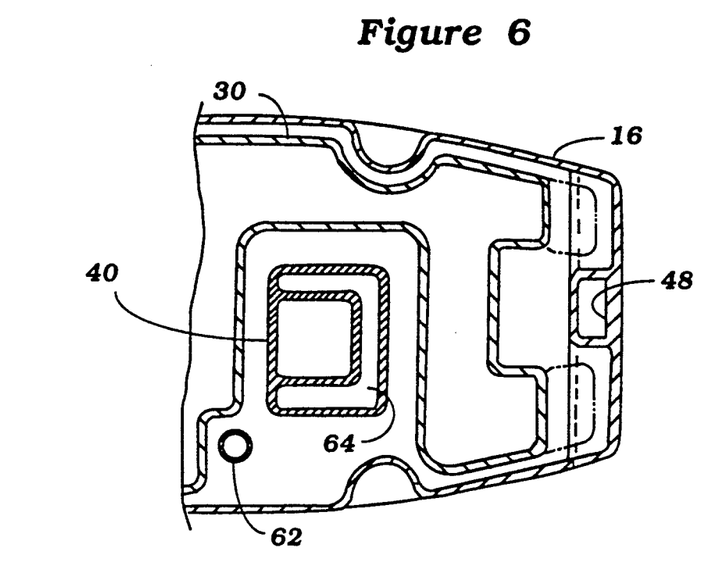
FIG. 6 is a cross-sectional view taken along the line VI—VI of FIG. 5.

In the second embodiment of the invention, shown in FIGS. 5 and 6, the exhaust gas within the secondary expansion chamber 246 is not isolated from direct contact with the oil pan 30. Rather, the secondary expansion chamber 246, in accordance with the second embodiment, has a relatively large interior area which allows the exhaust gases therein to cool down before contacting the outer surface of the oil pan 30. Upon exiting the primary expansion chamber 42 through the exhaust throttle passage 44, the exhaust gases are initially directed slightly downward by a downwardly extending integral extension (also known as a flange) 250 off the side of the cover 270 which projects into the exhaust gas flow pathway. The extension 250 aids in dispersing the exhaust gases throughout the area of the secondary expansion chamber 246. Thus, even when the exhaust gases do contact the oil pan's exterior surface, the oil pan 30 is not substantially heated by them.

Figure 7:
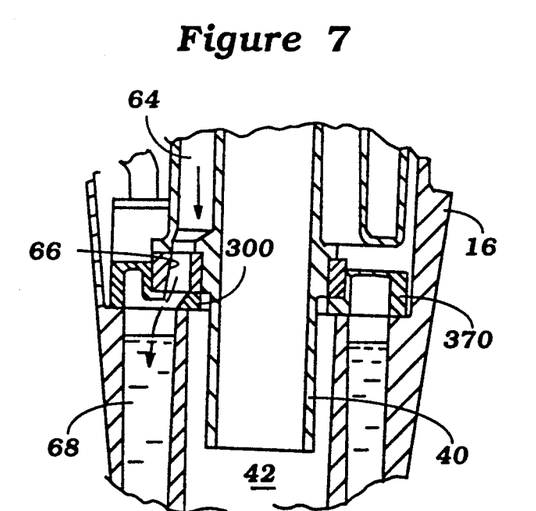
FIG. 7 is an enlarged cross-sectional view taken through a part of the upper portion of the drive shaft housing showing the exhaust and cooling systems in accordance with a third embodiment of the invention.

FIG. 7 is an enlarged cross-sectional view taken through a part of the upper portion of the drive shaft housing 15 showing the exhaust and cooling systems in accordance with the third embodiment of the invention. In this embodiment, a dam portion 300 is integrally formed with the cover 370 and prevents any coolant water from entering the primary expansion chamber 42. Instead, all of the coolant water from the water passage 64 is directed into the water jacket 68. This construction insures that salt water will not reach, and adhere to, the oil pan 30.

Figure 8:
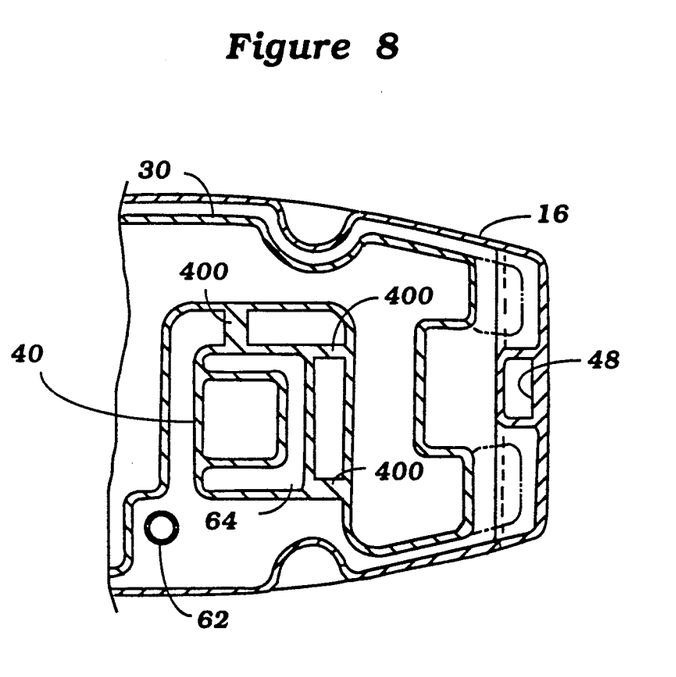
FIG. 8 is a cross-sectional view, in part similar to FIG. 6, showing a fourth embodiment of the invention.

FIG. 8 is a cross-sectional view, in part similar to FIG. 6, showing a fourth embodiment of the invention. In this embodiment the exhaust pipe 40 and the oil pan 30 are formed as an integral structure. However, these two components, 30 and 40, are separated from one another by a gap of space. Linking walls 400 bridge the gap in accordance with this integral construction.

Figure 9:
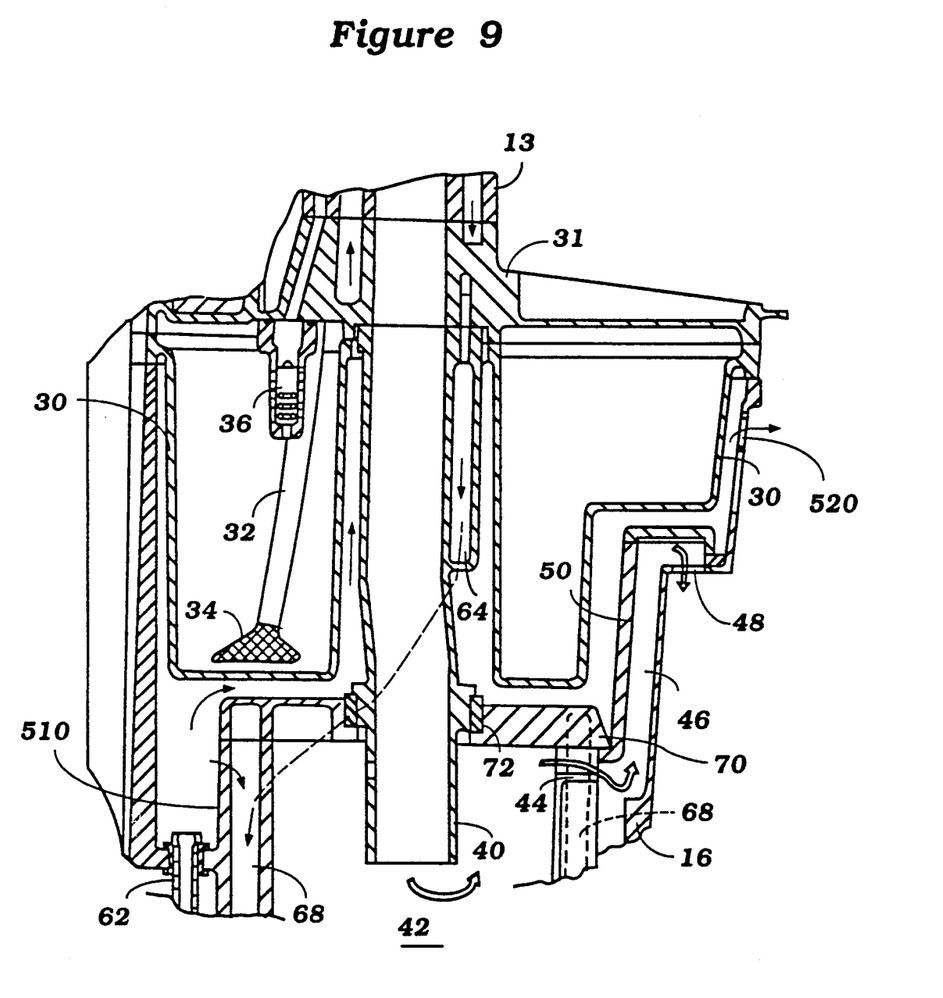
FIG. 9 is an enlarged cross-sectional view taken through a portion of the power head and upper portion of the drive shaft housing showing the engine and its exhaust, lubricating and cooling systems in accordance with a fifth embodiment of the invention.

FIG. 9 is an enlarged cross-sectional view taken through a portion of the power head and upper portion of the drive shaft housing showing the engine and its exhaust, lubricating and cooling systems in accordance with a fifth embodiment of the invention. In this embodiment, the water delivery pipe 62 introduces coolant water from a lowermost end of the upper casing 16 into a chamber area comprising the voids between the various components within the upper casing 16. The coolant water, therefore, passes along the outer surfaces of the primary expansion chamber water jacket 68 and cover 70, the exhaust pipe 40 and exhaust pipe water jacket 64, the oil pan 30, and the wall 50 of the secondary expansion chamber 46 before a portion of it flows through a passage in the support plate 31 and reaches the engine 13 for circulation therethrough. Thus, the coolant water is able to cool all of these components as it travels upwards through the upper casing 16.

A bypass hole 510 is provided through an upper portion of the primary expansion chamber water jacket's outer wall. Thus, a portion of the coolant water passing through the upper casing towards the engine 13 is diverted directly into the water jacket 68 to effect cooling of the expansion chamber 42.

Additionally, a coolant discharge passage 520 is provided within the upper casing 16, a short distance below the support plate 31. This discharge passage 520 allows water to escape from the upper casing 16, thereby permitting fresh coolant, entering via the water delivery pipe 62, to continuously flow therethrough and effect cooling of the various components via constant circulation throughout the upper casing 16 during operation of the engine. Since the discharge passage 520 is located along an upper portion of the upper casing 16, the void areas within the upper casing 16 are allowed to fill with coolant before any is permitted to escape via the discharge passage 520. The coolant pump, providing water coolant to the water delivery pipe 62 in this embodiment, is of a high capacity type in order to ensure that a sufficient volume of water is supplied into the upper casing 16 so that all of the void areas may be filled and, additionally, to ensure that coolant water reaches the engine for circulation therethrough.

The coolant water which is circulated through the engine cooling arrangement is returned through the support plate 31 to the water jacket 64 surrounding the exhaust pipe 40 and continues its flow according to any one of the embodiments set forth above. Some of the various flow paths taken by the coolant water according to this embodiment are depicted by the black arrows of FIG. 9.

Since fresh coolant water is constantly circulated throughout the upper casing 16 during operation of the engine, in the embodiment of FIG. 9, the temperature within the upper casing 16 is maintained at a relatively low level. Thus, the problems of excessive heating of the lubricant within the oil pan 30 and corrosion of the oil pan 30 from crystallized salts on its outer surface are avoided.

It should be readily apparent from the foregoing description that a number of embodiments of the invention have been illustrated and described which provide an improved exhaust, lubricant, and cooling system arrangement for four-cycle engines. Although a number of embodiments of the invention have been illustrated and described, various changes and modifications may be made from those embodiments without departing from the spirit and scope of the invention, as defined by the appended claims.

It is claimed:

1. An exhaust system for the water-cooled internal combustion engine of an outboard motor comprising an exhaust pipe and a primary expansion chamber, said exhaust pipe extending from a region beneath said engine into said primary expansion chamber; an oil reservoir and a casing member, said oil reservoir juxtaposed with respect to said exhaust pipe within said casing member and located at least in part above said primary expansion chamber; and a water jacket arrangement for containing liquid coolant surrounding at least a portion of said exhaust system, and means for precluding contact of the coolant in said water jacket arrangement with said oil reservoir so that coolant in the water jacket arrangement is prohibited from contacting said oil reservoir.

2. The exhaust system for the engine of claim 1 wherein said water jacket arrangement comprises a first water jacket surrounding at least a portion of said exhaust pipe and further comprises a second water jacket surrounding at least a portion of said primary expansion chamber.

3. The exhaust system for the engine of claim 2 further comprising a coolant outlet positioned at a lower end of said first water jacket, said coolant outlet located above said second water jacket and said primary expansion chamber so that liquid coolant may be directed from said first water jacket towards said second water jacket and said primary expansion chamber.

4. An exhaust system for the engine of claim 3 wherein said means for precluding contact of the coolant in said water jacket with said oil reservoir comprises a cover extending across an upper portion of said second water jacket for preventing said coolant from splashing out of said second water jacket; wherein said cover is attached to said second water jacket.

5. The exhaust system for the engine of claim 4 wherein said cover additionally extends across an upper portion of said primary expansion chamber and is provided with a first opening passage allowing a lower end of said exhaust pipe to extend therethrough; said cover further provided with a second opening passage within which said coolant outlet is located.

6. The exhaust system for the engine of claim 5 wherein said coolant directed from said first water jacket towards said second water jacket and said primary expansion chamber enters both said second water jacket and said primary expansion chamber.

7. The exhaust system for the engine of claim 5 further comprising means for directing said coolant from said first water jacket into said second water jacket, and thereby preventing the flow of any coolant into said primary expansion chamber.

8. The exhaust system for the engine of claim 7 wherein said coolant directing means comprises a coolant blocking member located between said coolant outlet of said first water jacket and an upper portion of a wall of said primary expansion chamber, said blocking member forming a part of a coolant flow path directing said coolant into said second water jacket.

9. The exhaust system for the engine of claim 5 further comprising a seal positioned between said exhaust pipe and said first opening passage of said cover.

10. The exhaust system for the engine of claim 9 further comprising a secondary expansion chamber located downstream of said primary expansion chamber along an exhaust gas flow pathway.

11. The exhaust system for the engine of claim 10 further comprising a wall isolating any exhaust gases within said secondary expansion chamber from contact with said oil reservoir.

12. The exhaust system for the engine of claim 10 further comprising a flange extending into said exhaust gas flow pathway and an exhaust gas passage which opens into said secondary expansion chamber, said flange located in close proximity to said exhaust gas passage opening into said secondary expansion chamber.

13. The exhaust system for the engine of claim 10 wherein one side of said oil reservoir is provided with a recess therein and said exhaust pipe extends vertically downward through said recess.

14. The exhaust system for the engine of claim 2 further comprising means for precluding contact of exhaust gases flowing through said exhaust pipe and said primary expansion chamber with said oil reservoir.

15. The exhaust system for the engine of claim 14 wherein said oil reservoir is an integrally formed structure comprised of a unitary piece of material with said exhaust pipe and said first water jacket.

16. The exhaust system for the engine of claim 15 further comprising a wall of said oil reservoir and a wall encasing said exhaust pipe and said first water jacket, said walls positioned so that they are spaced apart from one another.

17. The exhaust system for the engine of claim 16 further comprising at least one bridging segment integrally formed with said oil reservoir wall and said wall encasing said exhaust pipe and said first water jacket.

18. The exhaust system for the engine of claim 2 further comprising a cover enclosing the upper portion of said primary expansion chamber and said second water jacket; and a secondary expansion chamber, said secondary expansion chamber bounded by an inner side of said casing member and a wall; said primary expansion chamber communicating with said secondary expansion chamber via a connecting passageway; a chamber area formed within said casing member, said chamber area bounded by an inner side of said casing member, an outer side of said oil reservoir, an outer side of said exhaust pipe and said first water jacket, an outer side of said second water jacket and said cover, and an outer side of said wall of said secondary expansion chamber; and means for introducing a liquid coolant into said chamber area within said casing member, so that said liquid coolant is contained within and fills said chamber area.

19. The exhaust system for the engine of claim 18 further comprising a cooling arrangement provided within said motor and a passageway provided at an upper region of said casing member for delivering said liquid coolant from said chamber area into said motor cooling arrangement.

20. The exhaust system for the engine of claim 19 further comprising a passageway provided through an upper region of said casing member for allowing said liquid coolant to exit from said chamber area.

21. The exhaust system for the engine of claim 20 further comprising a passageway provided along an upper region of an outer wall of said second water jacket for allowing said liquid coolant to enter into said second water jacket from said chamber area.

22. The exhaust system for the engine of claim 21 wherein said liquid coolant is introduced into said chamber area within said casing member at a lowermost portion of said casing member.

23. The exhaust system for the engine of claim 22 wherein said casing member is an upper casing of a drive shaft housing.

24. The exhaust system for the engine of claim 23 said liquid coolant is obtained from the body of water within which an associated watercraft is operated.

25. The exhaust system for the engine of claim 1 wherein said water jacket arrangement has a containing boundary structure prohibiting any escape of coolant along the upper regions of the water jacket arrangement.

26. The exhaust system for the engine of claim 1 wherein said water jacket arrangement includes a jacket portion surrounding said primary expansion chamber; said jacket portion including a cover enclosing the top of said jacket portion thereby prohibiting any escape of coolant water from the uppermost region of said jacket portion.

27. An exhaust system for the water-cooled internal combustion engine of an outboard motor comprising an exhaust pipe and a primary expansion chamber, said exhaust pipe extending from a region beneath said engine into said primary expansion chamber; an oil reservoir and a casing member, said oil reservoir juxtaposed with respect to said exhaust pipe within said casing member; and means for precluding contact of exhaust gases flowing through said exhaust system with an entire outer surface area of said oil reservoir.

28. The exhaust system for the engine of claim 27 wherein said exhaust gases precluded from contacting said oil reservoir are exhaust gases contained within said exhaust pipe and said primary expansion chamber.

29. The exhaust system for the engine of claim 28 wherein said means for precluding contact of said exhaust gases with said oil reservoir comprises a cover extending across an upper portion of said primary expansion chamber.

30. The exhaust system for the engine of claim 29 wherein said cover is provided with a first opening passage allowing a lower end of said exhaust pipe to extend therethrough.

31. The exhaust system for the engine of claim 30 further comprising a first water jacket surrounding at least a portion of said expansion chamber and a second water jacket surrounding at least a portion of said exhaust pipe.

32. The exhaust system for the engine of claim 31 wherein a coolant outlet is positioned at a lower end of said second water jacket, said coolant outlet located above said first water jacket and said primary expansion chamber so that liquid coolant may be directed from said second water jacket towards said first water jacket and said primary expansion chamber.

33. The exhaust system for the engine of claim 32 wherein said cover is further provided with a second opening passage within which said coolant outlet is located.

34. The exhaust system for the engine of claim 33 further comprising a seal positioned between said exhaust pipe and said first opening passage of said cover.

35. The exhaust system for the engine of claim 34 further comprising a secondary expansion chamber located downstream of said primary expansion chamber along an exhaust gas flow pathway.

36. The exhaust system for the engine of claim 35 further comprising a flange extending into said exhaust gas flow pathway and an exhaust gas passage which opens into said secondary expansion chamber, said flange located in close proximity to said exhaust gas passage which opens into said secondary expansion chamber.

37. The exhaust system for the engine of claim 35 further comprising a wall isolating any exhaust gases within said secondary expansion chamber from contact with said oil reservoir.

38. The exhaust system for the engine of claim 35 wherein said coolant directed from said second water jacket towards said first water jacket and said primary expansion chamber enters both said first water jacket and said primary expansion chamber.

39. The exhaust system for the engine of claim 35 further comprising means for directing said coolant from said second water jacket into said first water jacket, and thereby preventing the flow of any coolant into said primary expansion chamber.

40. The exhaust system for the engine of claim 35 wherein one side of said oil reservoir is provided with a recess therein and said exhaust pipe extends vertically downward through said recess.

41. The exhaust system for the engine of claim 27 wherein said contact precluding means completely prohibits any contact of the exhaust gases flowing through said exhaust system with the oil reservoir.

42. An exhaust system for the water-cooled internal combustion engine of an outboard motor comprising an exhaust pipe and an expansion chamber arrangement, said exhaust pipe extending from a region beneath said motor into said expansion chamber; an oil reservoir and a casing member, said oil reservoir juxtaposed with respect to said exhaust pipe within said casing member; and a chamber area within said casing member, said chamber area bounded by an inner side of said casing member, an outer side of said oil reservoir, an outer side of said exhaust pipe, and an outer side of said expansion chamber; and means for introducing a liquid coolant into said chamber area within said casing member, so that said liquid coolant is contained within and fills said chamber area.

43. The exhaust system for the engine of claim 42 wherein said liquid coolant is introduced into said chamber area within said casing member at a lowermost portion of said casing member so that said liquid coolant fills said chamber area from its lowermost portion initially and progressively fills said chamber area in an upward direction as liquid coolant is continuously introduced therein.

44. The exhaust system for the engine of claim 43 further comprising a cooling arrangement provided within said motor and a passageway provided at an upper region of said casing member for delivering said liquid coolant from said chamber area into said motor cooling arrangement.

45. The exhaust system for the engine of claim 44 further comprising a water pump and a conduit leading into said lowermost portion of said chamber area, said water pump located beneath said chamber area and operable to move said liquid coolant through said conduit and into said chamber area.

46. The exhaust system for the engine of claim 45 further comprising a passageway through said casing member and positioned at an upper portion thereof, so that said liquid coolant exits said chamber area upon reaching said passageway.

47. The exhaust system for the engine of claim 46 wherein said water pump is a high capacity water pump.

48. The exhaust system for the outboard motor of claim 47 wherein said liquid coolant is obtained from the body of water within which an associated watercraft is operated.

49. The exhaust system for the engine of claim 48 wherein said casing member is an upper casing of a drive shaft housing.

* * * * *